US008308919B2

(12) United States Patent
     Fletcher

(10) Patent No.: US 8,308,919 B2
(45) Date of Patent: Nov. 13, 2012

(54) QUADRATIC ELECTROLYSIS

(76) Inventor: Timothy Fletcher, Everett, WA (US)

( * ) Notice: Subject to any disclaimer, the term of this patent is extended or adjusted under 35 U.S.C. 154(b) by 531 days.

(21) Appl. No.: 12/620,593

(22) Filed: Nov. 18, 2009

(65) Prior Publication Data

US 2011/0114506 A1    May 19, 2011

(51) Int. Cl.
    *C25B 1/06*    (2006.01)
(52) U.S. Cl. .................. 204/278; 204/230.7; 204/278.5; 205/628
(58) Field of Classification Search ............... 204/278
    See application file for complete search history.

(56) References Cited

U.S. PATENT DOCUMENTS

| 4,450,060 A * | 5/1984 | Gonzalez ..................... 204/268 |
| 5,865,966 A * | 2/1999 | Watanabe et al. .......... 204/278.5 |
| 6,821,398 B2 * | 11/2004 | Von Broembsen ........ 204/278.5 |

* cited by examiner

*Primary Examiner* — Harry D Wilkins, III
*Assistant Examiner* — Bryan D. Ripa

(57) ABSTRACT

An electrolysis device to separate water into its more economically valuable constituent hydrogen and oxygen gases. A neutral plate is interleaved between every magnetically charged electrode in an electrode stack to provide a means of spark suppression, a physical barrier between the hydrogen gas created at the cathode and oxygen gas created at the cathode, and to reduce deterioration of electrode surfaces caused by alternating polarity from an anode state to a cathode state. Scale of electrolysis cell electrodes are partially cleaned through a cycling of system polarity through a neutral electrode period. A means is provided to isolate and segregate dissociated hydrogen and oxygen gas.

15 Claims, 11 Drawing Sheets

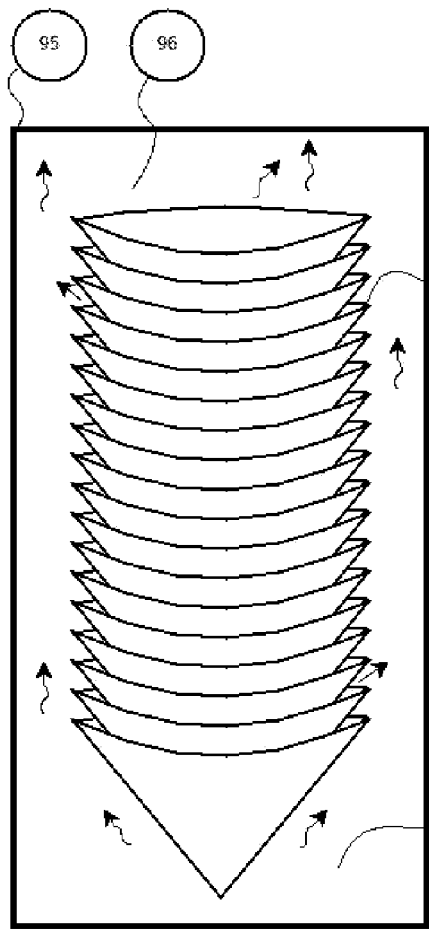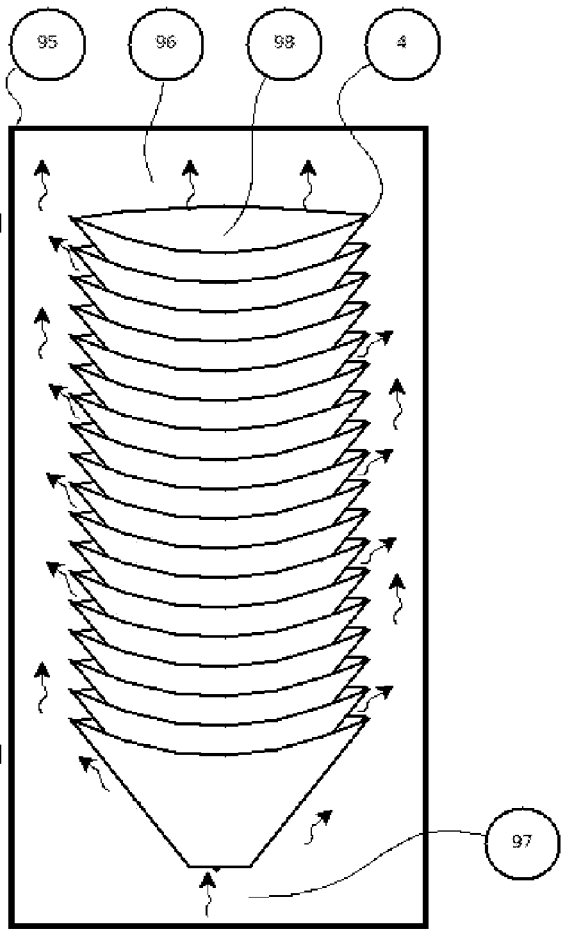

QUADRATIC ELECTROLYSIS

FIELD OF THE INVENTION

The present invention relates to the field of electrolysis, in which relatively inexpensive water is dissociated into its more economically valuable constituent hydrogen and oxygen gases.

BACKGROUND OF THE INVENTION

The field of electrolysis is well known. Prior art describes many devices which utilize electrolytic cells for dissociating water into its gas elements such as U.S. Pat. Nos. 6,257,175 and 7,240,641. Such electrolytic cells generally include an anode and a cathode, with both electrodes immersed in an electrolytic solution which acts as a catalyst to the dissociation of the sacrificed water. A DC potential is applied across the electrodes to provide the requisite energy to release the gases from an aqueous state. When external energy is supplied to an electrode immersed in an aqueous solution, hydrogen gas is produced at the cathode, while the anode produces oxygen gas.

Historically, electrolysis units have separated hydrogen and oxygen gas from water to capitalize on the energy value of the elemental gases that combine to form water. In addition to making use of the combustive value of the dissociated gases, an additional benefit is achieved with internal combustion engines through lower carbon emissions. Lower emissions result from a more complete combustion made possible by the additional oxygen harvested from dissociated water.

Most prior art electrolysis designs have not achieved fuel efficiency ratings that warrant large scale adaptation. Inefficiency inherent in the electrolysis process includes source electrical energy heating the electrolyte solution instead of providing the energy necessary to dissociate water of its constituent gases. The distance between electrodes is a relevant factor of electrolytic efficiency. As the distance between an anode and cathode increases, efficiency decreases. However, the closer the anode and cathode in proximity, the more likely an arc might cause a spark between the plates. Any sparking in the presence of dissociated gases presents a potential explosion hazard.

Many prior art electrolysis devices experienced insufficient effectiveness results, often due to a scale buildup on the electrodes. Any contamination on the surface of an electrode impedes electrical conductivity and thus diminishes the volume of gas dissociated. Maintenance associated with cleaning scale buildup from the electrodes can be prohibitive to widespread implementation of an electrolysis device and usually involves mechanical and chemical cleaning processes.

An approach to cleaning electrode surfaces through the use of reversed polarity has been utilized by the electrodialysis industry for many years. U.S. Pat. No. 4,461,693 discloses a polarity reversing process to extend the useful life of an electrode. U.S. Pat. Nos. 3,341,441, 2,863,813, and 3,341,441 also include polarity reversal for the purpose of dissolving buildup at the anode.

SUMMARY OF THE INVENTION

The intent of the present invention is to improve upon the efficiency of electrolysis units with an apparatus which uses minimal power to product output ratio, and produces dissociated gases while mitigating potential explosion hazard, and requires minimal maintenance other than occasionally adding makeup water. Although internal combustion engines are a typical use for electrolytic devices, this improved design can be used for any application that uses or stores either hydrogen or oxygen gas.

The present invention makes use of a neutral plate located between each magnetically charged electrode in a stack of electrodes. The use of a neutral plate in electrolysis allows the anode and cathode to be placed closer to each other without the commensurate risk of arcing a spark between the two electrodes.

Polarity of succeeding and preceding electrodes of an electrode stack are staggered by a half charge. A half charge is defined as the difference of potential between neutral and either a positive or a negative charge. A full charge refers to the potential difference of a positive and a negative charge. Thus a plate charged as an anode is preceded and succeeded in an electrode stack by an electrode which is neutrally charged (uncharged). Each neutral electrode is succeeded and preceded by electrically magnetized electrodes. An electrode charged as a cathode would be preceded and succeeded in an electrode stack by neutrally charged (uncharged) electrodes.

As a byproduct of most prior art electrolysis processes, scale comprised of baked electrolyte and other inert compounds would form on electrode surfaces reducing the efficiency of electrical energy transfer. Over time, the buildup of scale on the electrode surfaces requires the system to be shut down to perform a manual or chemical cleaning process of the electrode surfaces. A statically charged neutral electrode would not attain an advantage from cycling polarity and thus would have an even greater tendency to scale over time, generally requiring abrasive and or chemical cleaning periodically. The present invention eliminates the requirement to break down the system for routine descaling maintenance by utilizing a method of cycling polarity, which descales electrode surfaces as a byproduct of the electrolytic process The polarity of each electrode plate in this stack of electrodes is varied simultaneously, after a predetermined period of time or using whatever criteria metrics, through cycles of charge that include anodic, neutral, cathodic, and neutral before returning to an anodic charge and repeating the cycle continuously during operation. The orientation of each anode to each cathode through a neutral is continuously maintained as each electrode in a stack is cycled. Simultaneously altering polarity in this manner provides a conceptual unidirectional change in charge, and the conception of a "rolling polarity."

Transitioning from a charged electrode to the opposite charge through a neutral phase allows the chemical bonds to release at a more gradual pace, mitigating the damaging effects of pitting. Another benefit of a neutral plate in the electrolytic process is the physical barrier an additional neutral electrode provides. Without a physical separation between the dissociated gases of the anode and cathode, entropy would mix some percentage of the product together.

A novel electrolytic solution consisting of water, sodium bicarbonate, bismuth subsalicylate and magnesium sulfate is used as a catalyst for electrolytic action. The electrolytic formula also provides a protective electroplating at the anode, which reduces scale buildup at deterioration of the anode surface.

When it is desirable to isolate and maintain segregation between dissociated gases, a series of gas chambers are provided in the lid of the electrolysis cell. The width of each gas chamber is designed to match the spacing between the electrodes of the electrode stack. The walls of each gas chamber extend down to slightly above the electrodes. The neutral electrodes throughout the electrode stack provide a physical barrier separating each anodically and cathodically charged electrodes, which facilitates gas isolation and segregation.

Unlike other electrodes of the prior art which are primarily smooth surfaces, the present invention teaches the use of grooves cut into the plate. Such grooves increase the surface area of the electrodes with an atypically associated reduction in weight. Additionally, a novel electrode design is described in which a very limited quantity of electrolyte is allowed to contract the electrodes, providing maximal electrolytic action, with minimal energy lost to heating the electrolyte.

BRIEF DESCRIPTION OF IMAGES

FIG. 15 is an elevation view of conical electrode plates.

FIG. 16 is an elevation view of conical electrode plates in which water is allowed to flow through the middle of the conical electrodes as well as around and between them.

DETAILED DESCRIPTION OF DRAWINGS

Figure 1:
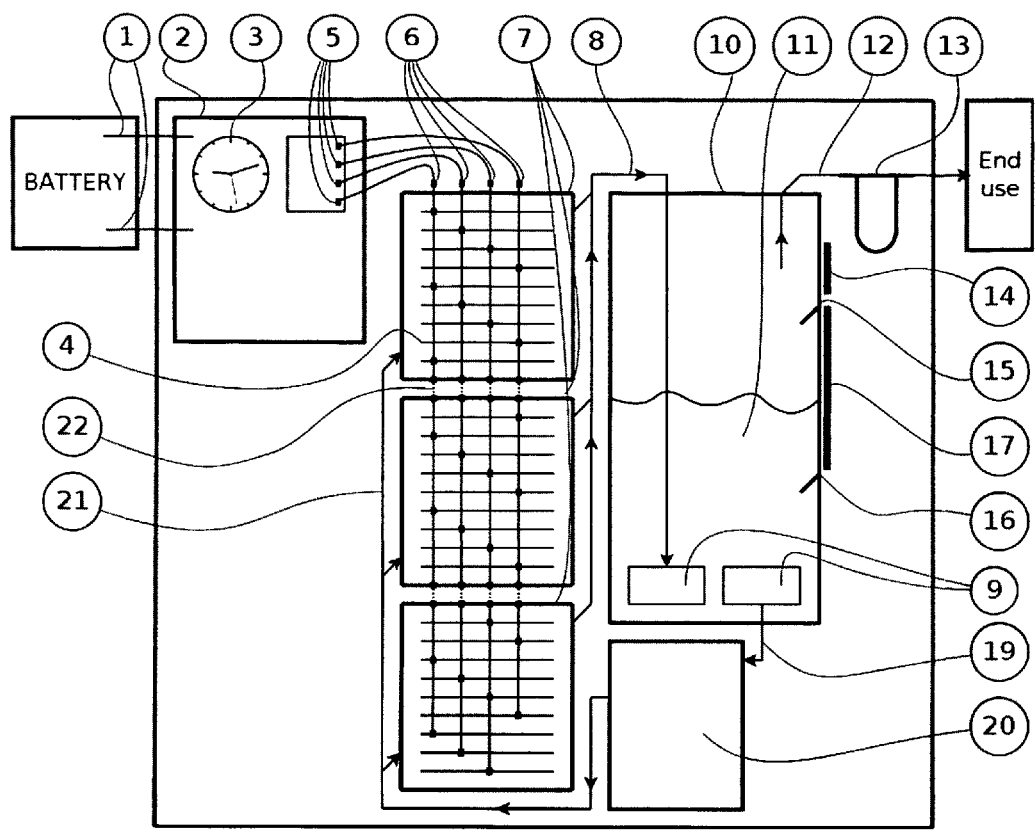
FIG. 1 is a schematic diagram of one embodiment of the present invention in which electrolytic gases are not isolated for delivery to the end use.
Figure 3:
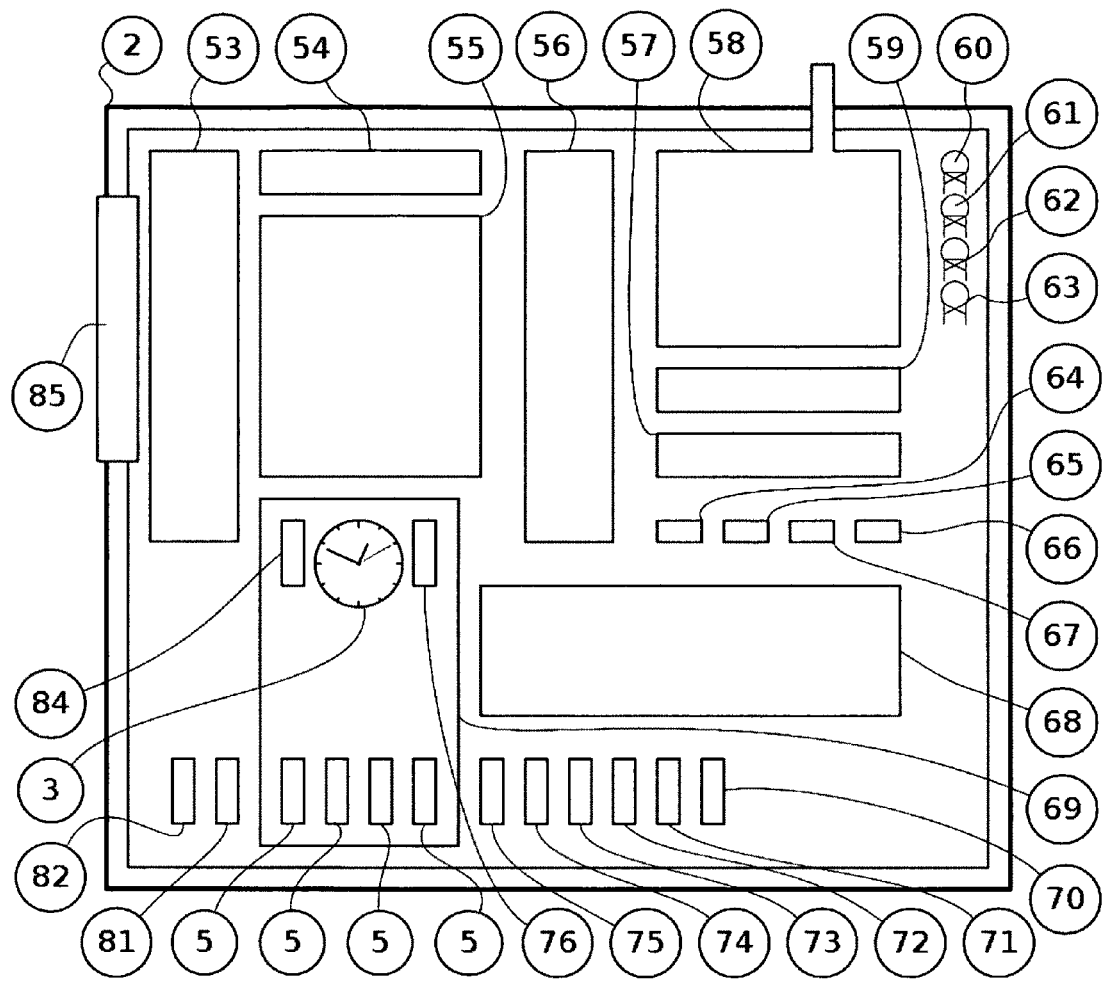
FIG. 3 is a schematic view of the electronic components of the present invention.

FIG. 1 provides a schematic layout of one embodiment of the present invention. Electrical energy is provided to the power control panel 2 from a typical 12 volt DC battery, such as a car battery, through conductors 1. FIG. 3 depicts the power control panel 2 in greater detail. A timing device 3 initiates a polarity shift, after a predetermined period of time to a minimum of four isolated electrical contacts 5. Said polarity shift is conducted to isolated electrical busses 6. All current embodiments of the present invention use a minimum of four electrical busses 6. Each electrical bus 6 is electrically common with one or more electrode plates 4. Electrical busses are interlaced such that the electrode plates 4 common to the electrical busses 6 are spaced an equal distance apart in a row forming a stack of electrode plates 23 easily visualized in FIG. 15. In all embodiments, the electrode plates 4 common to the electrical busses 6 are interleaved such that every fourth electrode plate 4 in the stack is common to the same electrical bus 6. Each plate stack is self-contained and isolated within a production cell 7, in which an electrolysis process dissociates water into its constituent gases.

Mostly gas and some liquid discharges through a gas conduit 8. The tube terminates at the bottom of a fluid reservoir 10, where any trapped particles in the electrolysis cell discharge are passed through a magnet 9. The gas conduit 8 terminates at the bottom of fluid reservoir 10 to provide maximal chemical interaction of both gases and remaining electrolyte 11. The electrolyte mixture 11 consists of approximately 86.5% water, 10.8% sodium bicarbonate, 1.35% bismuth subsalicylate , and 1.35% magnesium sulfate by volume. Percentages of constituent elements fluctuate during operation. Sodium bicarbonate can be substituted with the following: citric acid, ammonium bicarbonate, calcium bicarbonate, potassium bicarbonate, sodium hydroxide, potassium hydroxide, and weak organic acids. Other substitutions require material suitability analysis of the production cell container, the anode and the cathode. These elements include cesium, sulfur, thallium, gallium, vanadium, germanium, selenium, chlorine, astatine, molybdenum, beryllium, titanium, scandium, fluorine, iodine, chlorine, and chlorides. Bismuth subsalicylate can be substituted with silver, gold, platinum, palladium, antimony, copper, zirconium, potassium, sodium, yttrium, lithium, calcium, strontium, barium, magnesium, aluminum, manganese, zinc and barium. Water can be substituted with filtered sea water or any clean water source.

Fluid level of the fluid reservoir 10 is monitored by a high water indicator 15 and a low water indicator 16. An optical sensor 17 is provided to detect fluid in the reservoir. A thermal sensor 14 is provided to guard against excess heat entrapped in the electrolyte. The aforementioned sensors 14 and 17 will cut off power to the entire invention upon activating.

Gases, including but not limited to hydrogen, oxygen and hydroxide are discharged through a gas discharge hose 12 to the end use of the dissociated gas, such as a carburetor of an internal combustion engine. A fluid trap 13 is oriented vertically below gas discharge hose 12 to isolate and trap any water that might escape the fluid reservoir 10.

A pump 20 takes suction from the bottom of the fluid reservoir 10 through a liquid hose 19. Prior to entering the 19 hose the electrolyte solution passes through a magnet 9 to remove any ferrous solids in the solution upstream of the pump. One or more pumps discharge into the bottom of the production cell 7 through a fluid hose 21. Multiple production cells 7 can be linked together via jumper leads 22.

Figure 2:
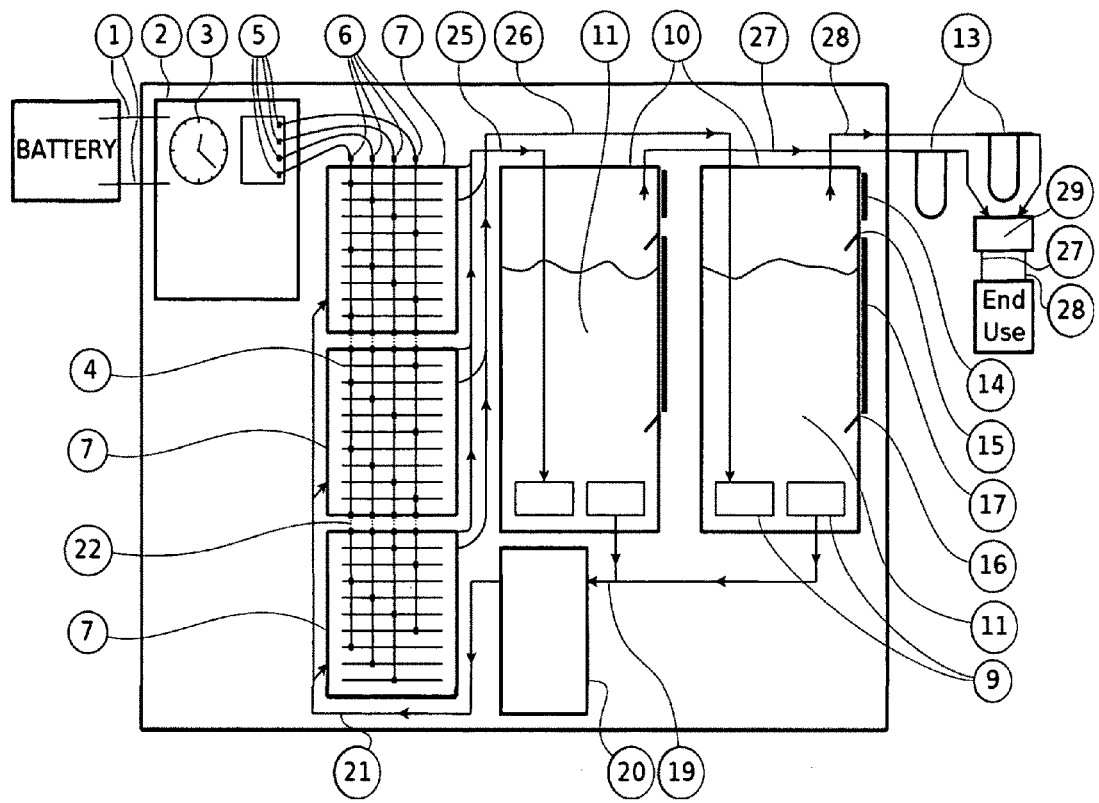
FIG. 2 is a schematic diagram of one embodiment of the present invention in which electrolytic gases are isolated and segregated for independent delivery to whatever end use.

FIG. 2 provides a schematic layout of another embodiment of the present invention. Electrical energy is provided to the power control panel 2 from a typical 12 volt DC battery, such as a car battery, through conductors 1. FIG. 3 depicts the power control panel 2 in greater detail. A timing device 3 initiates a polarity shift, after a predetermined period of time to isolated electrical contacts 5. Said polarity shift is conducted to isolated electrical busses 6. All current embodiments of the present invention utilize a minimum of four electrical busses 6. Each electrical bus 6 is electrically common with one or more electrode plates 4. Electrical busses are interleaved such that the electrode plates 4 common to the electrical busses 6 are spaced an equal distance apart in a row forming a stack 23 of electrode plates 4 easily visualized in FIG. 15. In all embodiments, the electrode plates 4 common to the electrical busses 6 are interleaved such that every fourth electrode plate 4 in the stack 23 is common to the same electrical bus 6. Each plate stack is self-contained and isolated within a production cell 7, in which an electrolysis process dissociates water into its constituent gases.

Hydrogen and oxygen gas dissociated through the electrolytic process are isolated and segregated in the production cell 7 and delivered under a partial vacuum to the bottom of separate fluid reservoirs 10 through hoses 25 and 26. The hoses are discharged to the bottom of the fluid reservoirs 10 to provide maximal agitation of the production cell discharge to facilitate electrolyte stabilization. A ferrite magnet 9 at the discharge of hoses 25 and 26 removes whatever ferrite metallic particles that may become suspended in the electrolyte solution.

Gas discharge hoses 27 and 28 route separated hydrogen and oxygen gases through a 13 water trap for each gas discharge line from the fluid reservoir 10. A gas directional control valve 29 takes isolated gases from each fluid reservoir 10 and switches delivery routing of the isolated gases to their end use destination each time the polarity to the electrode plates 4 is cycled.

The electrolyte mixture 11 consists of approximately 86.5% water, 10.8% sodium bicarbonate, 1.35% bismuth subsalicylate , and 1.35% magnesium sulfate by volume. Percentages of constituent elements fluctuate during operation. Sodium bicarbonate can be substituted with the following: citric acid, ammonium bicarbonate, calcium bicarbonate, potassium bicarbonate, sodium hydroxide, potassium hydroxide, and weak organic acids. Other substitutions require material suitability analysis of the production cell container, the anode and the cathode. These elements include cesium, sulfur, thallium, gallium, vanadium, germanium, selenium, chlorine, astatine, molybdenum, beryllium, titanium, scandium, fluorine, iodine, chlorine, and chlorides. Bismuth subsalicylate can be substituted with silver, gold, platinum, palladium, antimony, copper, zirconium, potassium, sodium, yttrium, lithium, calcium, strontium, barium, magnesium, aluminum, manganese, zinc and barium. Water can be substituted with filtered sea water or any clean water source. Fluid level of the fluid reservoir 10 is monitored by a high water indicator 15 and a low water indicator 16. An optical sensor 17 is provided to detect fluid in the reservoir. A thermal sensor 14 is provided to guard against excess heat entrapped in the electrolyte. The aforementioned sensors 17 and 14 will cut off power to the entire invention upon activating. A low water indicator, 16 is provided. Electrolyte 11 and any added water pass through a ferrite magnet 9 prior to being delivered to the system pump 20, through liquid hose 19. The pump 20 discharges electrolyte solution through liquid hose 21 to the production cell(s) 7. Multiple cells of an unlimited number can be ganged in parallel through use of jumpers 22.

FIG. 3 is a component schematic of the power control unit 2. Electrical power is supplied to the positive (+) lead from an electrical source, such as a battery identified as item 82. The negative (−) lead from the battery or other electrical source is connected to item 81. A main relay bank and fuse directory 53 provides protection from too much current from being drawn by the power control unit 2. Cooling fans 54 and 85 provide circulating air to the componentry of the power control unit 2. A switching regulator 55 provides the necessary control to direct positive charge, negative charge or no charge (neutral) to the electrode plates 4 as dictated by the timing control device 3. 56 depicts control processing chips and primary resistors. 57 is the power controls for the electrolyte pump. Tuning controls, including: on, power output to cells in form of cycle, timing, speed, production amounts are indicated represented by 58. Fan controls are indicated at 59. 60 is a power indicator light for power control unit 2. 62 is a red light to indicate a fluid overfill condition. 63 is a green light to indicate that the fluid reservoir is 10 is full. 64 is a blue light to indicate a low fluid condition. The pump fuse and bus is shown as 64. 65 is the fan fuse and bus. 66 depicts the fluid monitor fuse and bus. 67 is an empty fuse and bus, holding location for an extra fuse. 68 is the controls for monitoring the liquid level of the electrolyte. 69 is the cycling power position power control. 70 is an accessory ignition power connection. 71 is the ground connection for the pump. 72 is the pump power connection. 73 is the fan ground connection. 74 and 75 represents fan power connections. 75 is the fan power. 76 is the primary ground connection for the cell power regulator. Item number 5 represents power to the electric conductor busses 6. 84 is the primary power connection to the cell power regulator.

Figure 4:
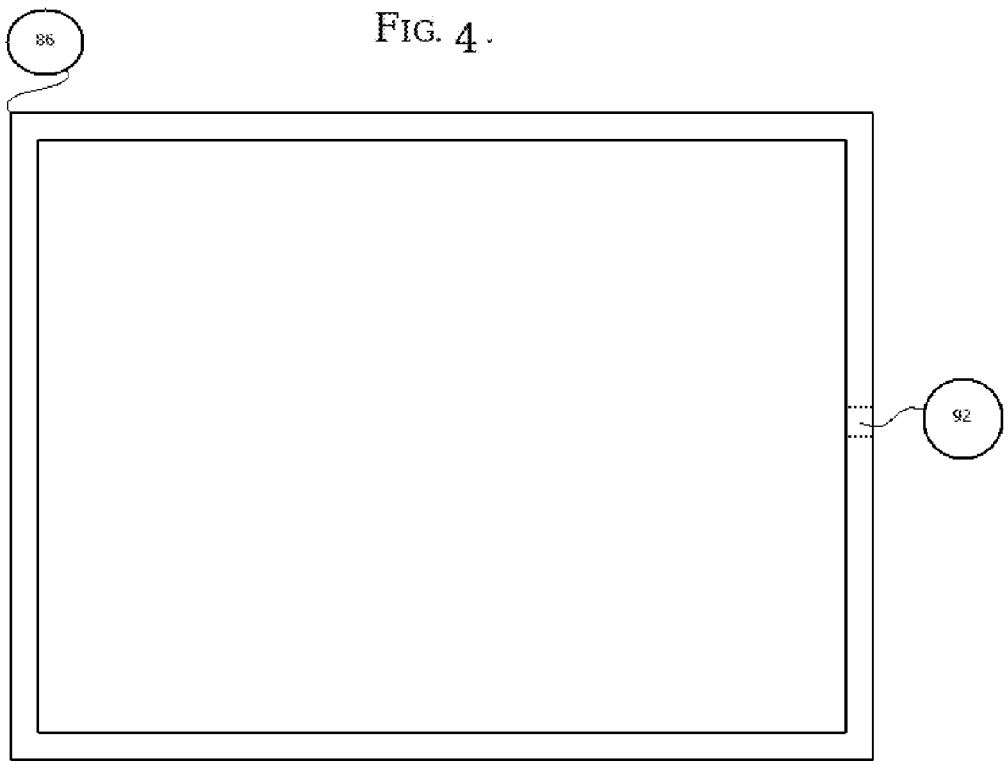
FIG. 4 is a plan view of a mixed gas delivery system.

FIG. 4 is a plan view of the mixed gas electrolysis cell discharge system 86. The entire area about the electrode stack is an open cavity in which all dissociated gases mix and discharge through a single cavity 92

Figure 5:
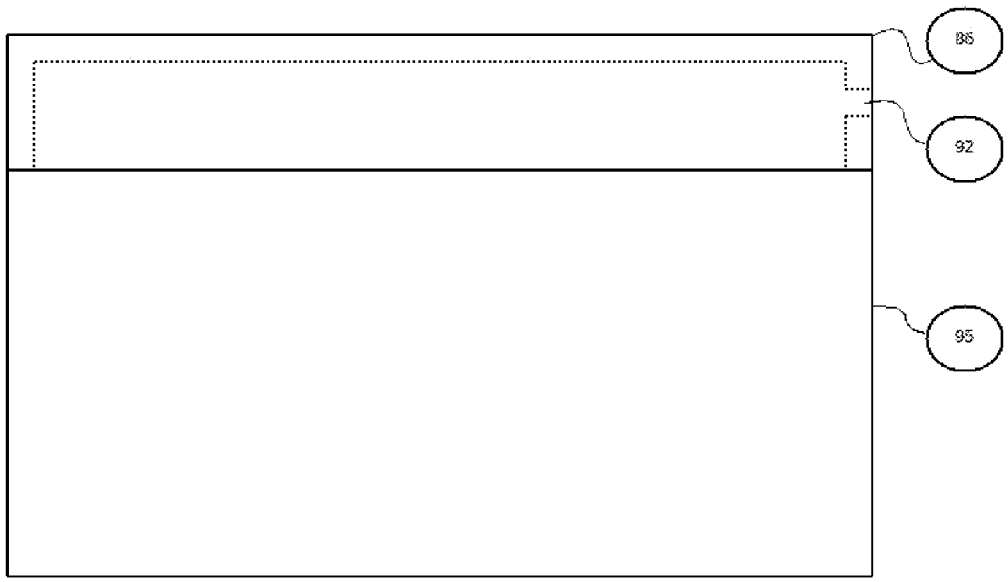
FIG. 5 is a side view of a mixed gas delivery system and the electrolysis cell base.

FIG. 5 represents a side view of the mixed gas electrolysis cell discharge system 86. The gas discharge is indicated as 92. An elevation of a electrolysis cell enclosure is shown as item 95. The electrolysis cell enclosure can be made from many materials including, but not limited to, glass, plastics or any other durable, light weight and non-conductive material.

Figure 6:
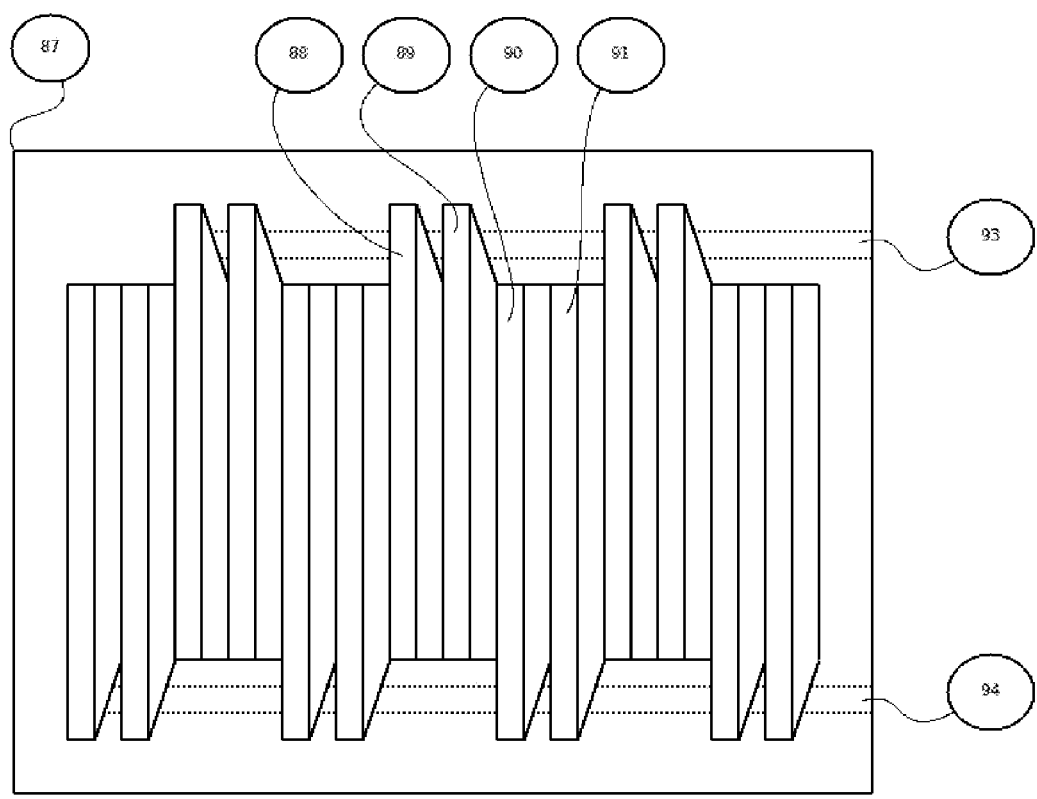
FIG. 6 is a plan view of the gas isolation and segregation system for an isolate gas application.

FIG. 6 is a plan view of the gas isolation and segregation system 87. Items 88 thru 91 represent gas isolation and segregation chambers, which are disposed directly above electrode plates of the electrode stack 23. In operation, the polarity of an electrode plate 4 varies over time, and cycles through a cathodic, neutral, anodic, and neutral charge. For purposes of this description, the polarity of the electrode plates 4 (not shown) is arbitrarily assigned so that related gas chamber locations above the electrode plates 4 can be shown. If item 88 is the chamber area above an anode, item 89 is the area above a neutral plate. Item 90 is the gas isolation chamber above the cathode and item 91 represents the area over a neutral plate. This sequence is maintained throughout the electrode stack 23 (not shown). Isolated gases are passed through manifolds 93 and 94.

Figure 7:
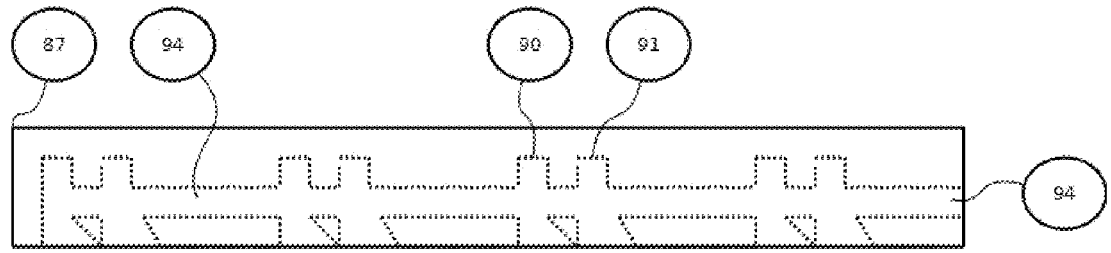
FIG. 7 is a side view of the gas isolation and segregation system.

FIG. 7 represents a side view of the gas isolation and segregation system 87. The figure only shows a single side of the gas isolation and segregation system 87. In this view, the isolated gas discharge manifold 94 is common to two gas isolation and segregation chambers 90 and 91. These gas isolation and segregation chambers 90 and 91 are arbitrarily assigned to the area over the cathode and a neutral electrode. As such, the 94 manifold is currently passing dissociated hydrogen gas. At this same time, gas isolation and segregation chambers 88 and 89 (shown in FIG. 6) would be venting oxygen to gas discharge manifold 93. When the polarity of the plates is cycled, each electrode 4 changes through a half degree of charge change. Every other change of polarity in the electrodes 4 requires the gas manifold discharges to be switched to continue isolation the dissociated gases.

Figure 8:
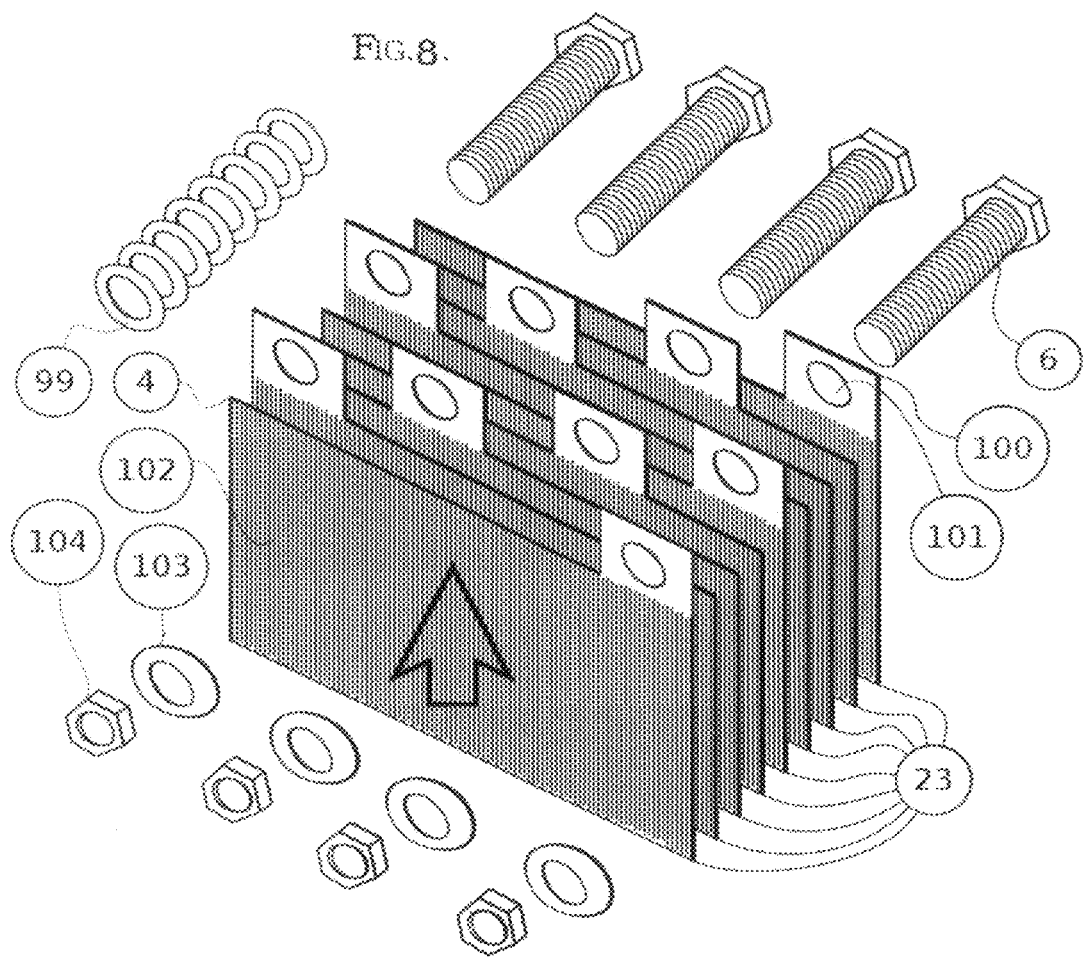
FIG. 8 is a view of the interface between electrode plates and the four electric conductor busses. The plurality of electrodes made common to the busses create an electrode stack.

FIG. 8 shows one embodiment of the present invention in which electrical connection of the electrodes 4 to the electric busses 6 is achieved through a raised surface 100 through which an aperture 101 is provided for clearance of the electrical bus 6. The electrode plates 4 are spaced apart using non-metallic spacers 99, and are maintained in compression using a 104 nut, acting through a 103 washer. A plurality of electrodes assembled in this manner form an electrode stack 23. Grooves 102 are shown cut into the electrode plate. The depth of the cut is less than 25 percent of the electrode thickness or less than 0.20 mm for the thickness of the present embodiment electrode plates 4, which is 0.81 mm. The width of the groove is approximately 0.20 mm, and the grooves are spaced approximately 0.40 mm on centers, across both sides of the entire electrode surface.

Figure 9:
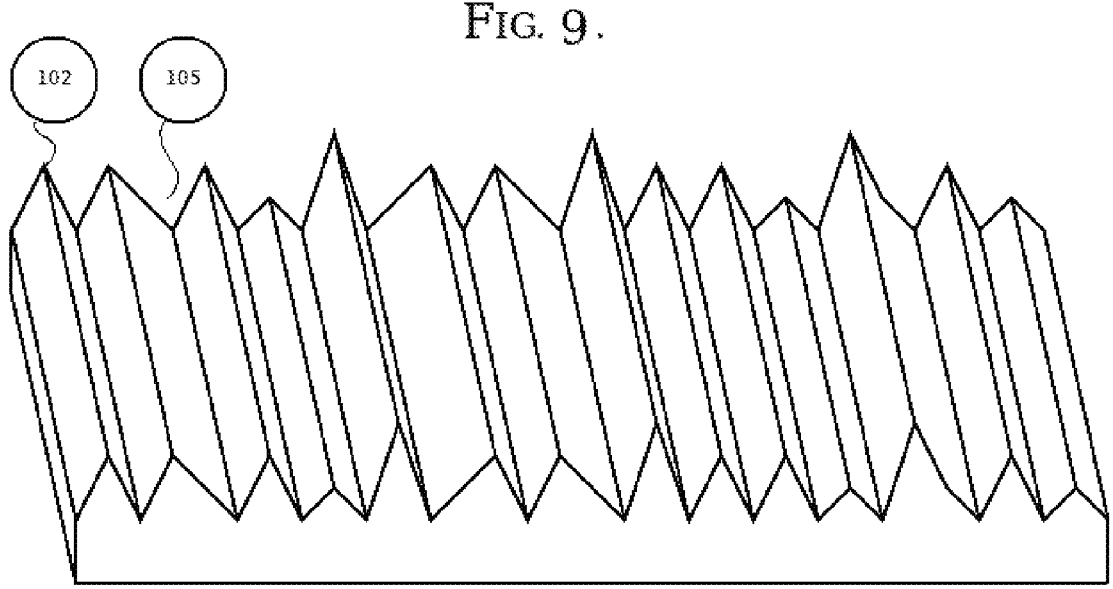
FIG. 9 is a magnified view of a plate with grooves cut into the surface.

FIG. 9 is a close-up view of the grooves 102 etched into the electrode plate 4 surface. Bubbles are insulative, which hinders the electrolytic process. Hence anything that can accelerate the bubbles on their way to the fluid reservoir 10 will increase the efficiency and output of the unit. The geometric shape of the bubble migration path is shown as a sharp "V," 105 which provides a poor surface for the bubble to adhere to. The effect of this shape etched into the electrode surface is a quicker release of gas from the electrode 4. Also, bubbles are prevented from any side-to-side motion by the geometry of the grooves.

Figure 10:
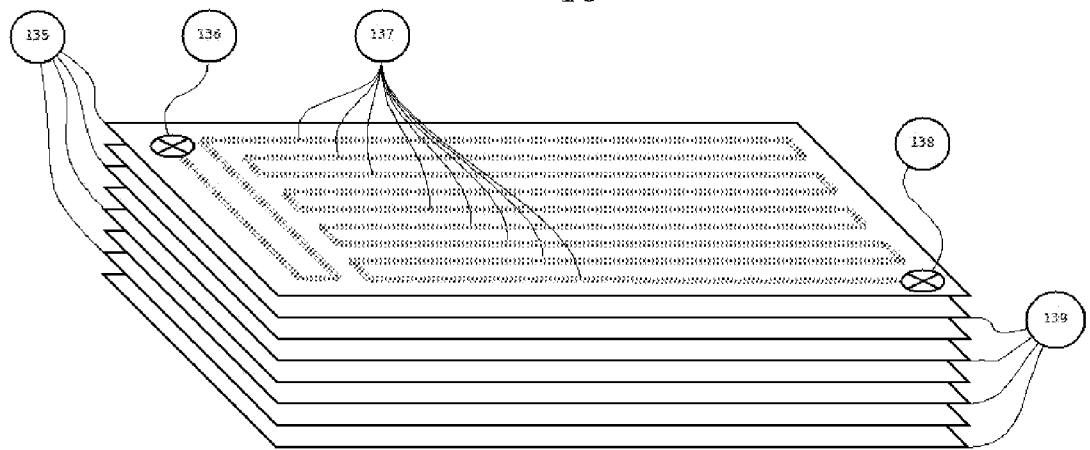
FIG. 10 is a projected elevation view of an electrode in which channels are cut into both sides of an electrode, with the electrodes being spaced closely enough together to allow a restricted amount of electrolyte to pass across the electrodes under pressure for increased efficiency.

FIG. 10 is a projected elevation view of flat electrode plates 135 in which symmetrical grooves 137 have been cut, cast or formed on both sides of the 135 electrodes. The grooves are designed to remove less than half of the plate thickness. Current embodiment electrode plates are 0.81 mm thick. Grooves are designed for a depth of 0.2, with a tolerance range of 0.162 mm-0.205 mm. The width of the grooves is also 0.2 and grooves can be located as closely as 0.8 mm on centers. Increasing the number of grooves per unit area increases the capacity of the system. A 0.8 mm edge margin is maintained around the periphery of the electrode plate 4 to prevent electrolyte escape or electrode plate 4 stock curling.

Electrolyte is pumped into the plate stack through the aperture depicted by 136. Gas produced in the production cell, along with some electrolyte is discharged through the discharge outlet 138. An electrically insulating material 139 is used between electrodes 135 to maintain the electric potential between electrodes. This electrolysis cell design requires no separate container or casing as the electrolyte is contained within the electrodes, which have a liquid-tight seal between them, enabling the electrodes to function as a separate production cell housing.

Figure 11:
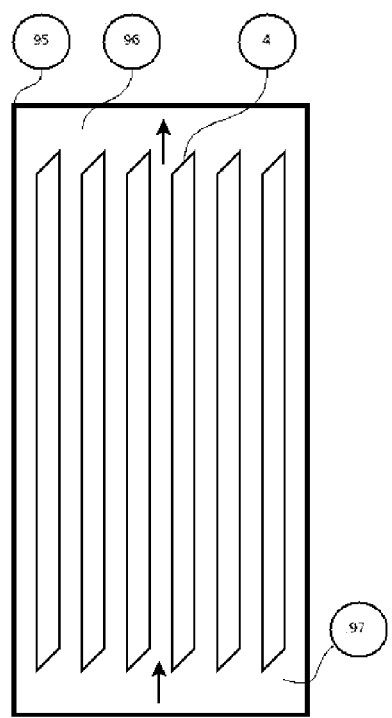
FIG. 11 shows an expanded elevation view of electrode plates in which the height of the plates is greater than the width of the electrode plates.

FIG. 11 is a projected elevation view of flat electrode plates with a height dimension exceeding the width. The production cell enclosure is shown as 95. A gap 96 is provided directly above the electrode plates 4 (six plates shown) where gases collect prior to be discharged to the fluid reservoir 10. The space directly below the electrode plates is shown as item 97, where pump discharge fluid is circulated prior to being pushed through the electrode plates 4.

Figure 12:
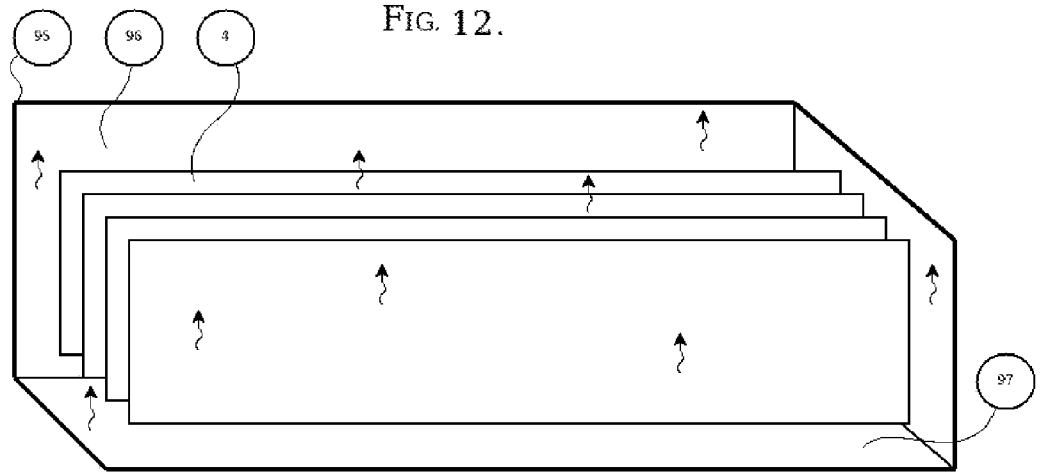
FIG. 12 shows an expanded elevation view of electrode plates in which the width of the plates is greater than the height of the electrode plates.

FIG. 12 is a projected elevation view of flat electrode plates with a width dimension exceeding the height. Production cell enclosure is shown as item 95. A gap 96 is provided directly above the electrode plates 4 (six plates shown) where gases collect prior returning to the fluid reservoir. The space directly below the electrode plates is shown as item 97 where pump discharge fluid is circulated prior to being pushed through the electrode plates 4.

Figure 13:
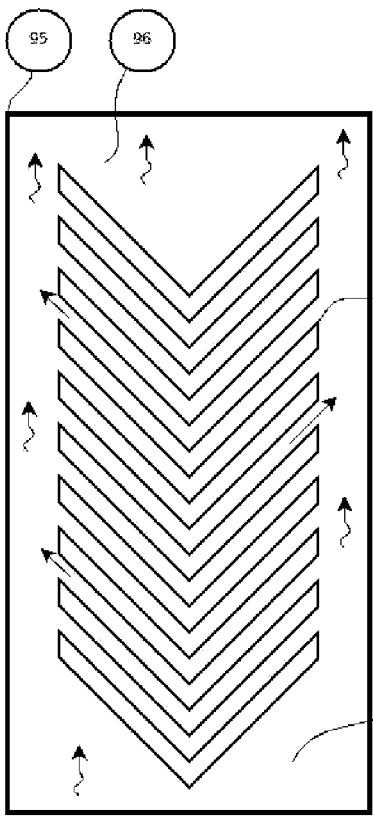
FIG. 13 is a cross section view of electrode plates which are bent through ninety degrees.

FIG. 13 is a cross section view of flat electrode plates formed into an approximate 90 degree angle. The production cell enclosure is shown as 95. A gap 96 is provided directly above the electrode plates 4 (ten plates shown) where gases collect prior returning to the fluid reservoir. The space directly below the electrode plates is shown as item 96 where pump discharge fluid is circulated prior to being pushed through the electrode plates 4.

Figure 14:
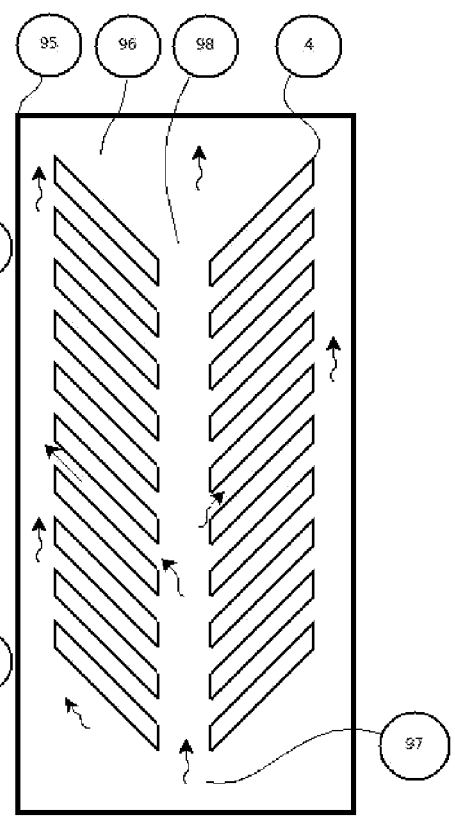
FIG. 14 is a cross section view in which plates are constructed in a herring bone fashion with a passage through the center of the plates.

FIG. 14 is a cross section view of flat electrode plates arranged such that electrolyte can flow through a center channel 98, in addition to the flow that occurs between the closely separated electrode plates 4. Production cell enclosure shown as 95. A gap 96 is provided directly above the electrode plates 4 (twenty plates shown) where gases collect prior returning to the fluid reservoir. The space directly below the electrode plates is shown as item 97 where pump discharge fluid is circulated prior to being pushed through the electrode plates 4.

FIG. 15 is a cross section view of conical electrode plates. The production cell enclosure is shown as 95. A gap 96 is provided directly above the conical electrode plates 4 (eighteen electrodes shown) where gases collect prior returning to discharging from the electrolysis cell 7. The space directly below the electrode plates is shown as item 97 where pump discharge fluid is circulated prior to being pushed through the electrode plates 4.

FIG. 16 is a cross section view of conical electrode plates in which a center aperture 98 is bored, allowing electrolyte to flow through the center of the plates 4. The production cell enclosure is shown as item 95. A gap 96 is provided directly above the conical electrode plates 4 (eighteen electrodes shown) where gases collect prior to discharging from the electrolysis cell 7. The space directly below the electrode plates is shown as item 97 where pump discharge fluid is circulated prior to being pushed through the electrode plates 4.

Figure 17:
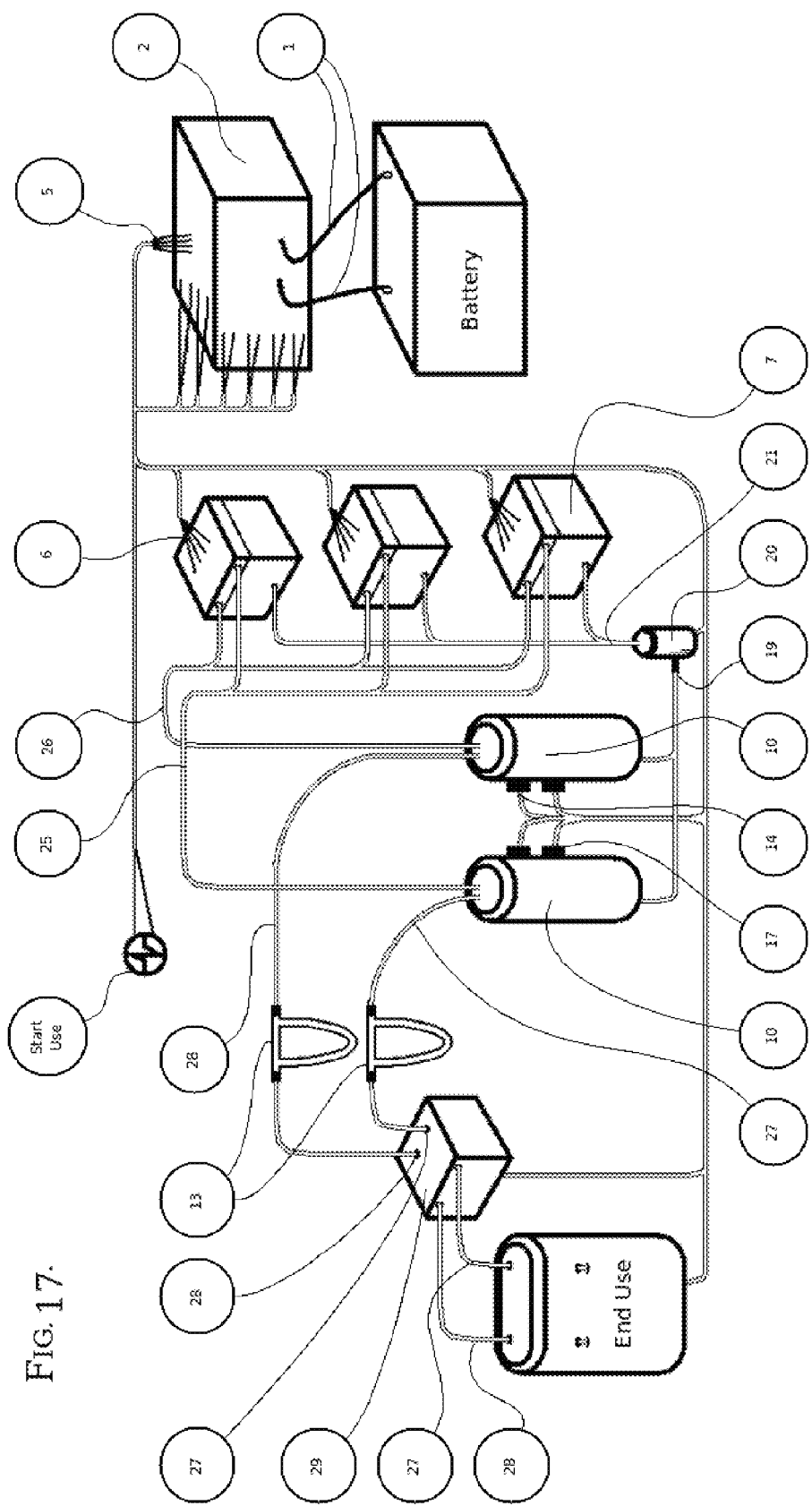
FIG. 17 is a blowup view schematic of an embodiment of the present invention intended for cover artwork.

FIG. 17 is an exploded view of one embodiment of the present invention. The sketch is provided as suggested artwork to associate with the present invention.

DETAILED DESCRIPTION OF THE INVENTION

All present embodiments of invention contemplate a scavenge source of electricity or an alternative power source. Most commonly, the electric potential required to operate a motor vehicle is utilized to energize the electrolytic process. Relays and rectifiers are used to regulate direct current (DC) from a source such as a 12 volt automotive battery. A timing device is used to initiate polarity cycling.

Electrolysis cell casings are constructed from non-conductive and watertight materials. There is a bottom casing portion, which houses electrode plates and an electrolyte solution, and an upper portion through which dissociated gases vent to the bottom of the fluid reservoir.

Electrodes within the electrolytic cells are organized in stacks, which are called electrode stacks. Four different electrode plate peripheries are utilized in the preferred embodiment, each having a slightly different tab location along an edge of the plate. This tab is made common with one of four electrical busses. At the center of each tab is an aperture just large enough to pass the buss member. Each unique electrode periphery is interleaved with the other similar electrode peripheries such that the same shape occurs in the stack every fourth electrode plate. An electrical conductor, such as a bolt, is inserted though the aperture of every fourth plate to create the interleaved electrode stacks. These four interleaved electrode plate stacks, at any given instant of operation, will charge one stack with an anodic charge, one stack with a cathodic charge and two independently isolated neutral stacks. Non-conductive spacers are used to create the gap spacing between electrodes.

A primary distinction between the present invention and prior art electrolysis devices is the use of a neutrally charged electrode interleaved between all magnetically charged electrodes. Use of the neutral plate is beneficial for several functions. On a cursory level, the neutral electrode provides a spark inhibitor between each anode and cathode, which can be increasingly important as the gap between anode and cathode potentially shrinks in the search for better performance or efficiency. This same physical barrier between an anode and a cathode also helps to prevent dissociated gases from mixing together if it is desirable to isolate and segregate the hydrogen gas from the oxygen.

Changing the polarity of electrolysis electrodes is advantageous to reverse the byproduct effects of the electrolytic process, namely scaling. In operation, the energized electrodes bond with elements and compounds in the electrolyte solution. This scaling reduces the efficiency of electrical transfer from the electrodes to the water to be dissociated. Reversing the polarity of an electrode is known to reverse the process of electrode surface accumulation. Prior art electrodes are known to alternate between an anode and a cathode state, without transitioning through a neutral charge to take advantage of the descaling phenomenon. The present invention cycles each electrode through a neutral phase after each electrically magnetically charged (anodic and cathodic) phase. Thus, when polarity is changed, rather than appearing to vacillate from anode to cathode as in the prior art, polarity of the present invention conceptually undergoes a unidirectional polarity migration, which creates a rolling polarity. One of the advantages of using a cycling polarity through a neutral plate is that the change in charge, between anodic and cathodic phases, is more gradual allowing elements bonded to the electrodes to release more slowly, resulting in less surface damage to the electrode.

Polarity cycling for all present embodiments of the invention is achieved as a function of time, although electrical or other metrics could be used to initiate polarity change. Under typical operating conditions, sixteen to twenty minutes provides the best performance with approximately eighteen minutes being optimal. The controls allow polarity cycles to last from one minute to thirty-eight minutes.

Although it is conceptually possible to achieve a cycling polarity with only three buses, anodic, cathodic and neutral, all current embodiments of the present invention utilize four busses. Adding the extra bus allows for easier troubleshooting if there is any problem. Also, the logic to cycle a single bus serving a varying two plates is more overhead than the application requires.

Water to be dissociated is circulated in a solution of electrolyte by one or more pumps. The aqueous solution is pumped into the bottom of the production cells. Spacing between the electrodes of the electrode stack and between the electrode stacks and the casing is kept to a minimum to minimize the quantity of excess water. Excess water can be described as water not being dissociated into its constituent gases, and additional to the amount of water necessary to keep the electrolyte elements in solution.

A mixture of mostly gas and some liquid exits the production cells under a partial vacuum. The production cell discharge is routed to the bottom of a fluid reservoir through a conduit. A ferrite magnet with negative polarity facing the fluid reservoir is positioned close to the conduit discharge to remove any ferrous particles released through system operation. The production cell discharge is routed to the bottom of the liquid reservoir to provide the discharge with maximal agitation. The stable gases resulting from the electrolytic process will not react with the other elements and will discharge through the top of the liquid reservoir. Unstable compounds (ionized atoms) of the electrolyte will reestablish bonding with the elements lost through dissociation in the production cell in the electrolytic solution so that the process can be repeated. Electrolyte and water are recirculated to the pump through a conduit that has a ferrite magnet at the entrance to trap any magnetic particles in the electrolyte solution.

Gas that discharges from the fluid reservoir pass over a loop of conduit designed to trap any water that may have found its way into the gas delivery line. The loop is closed, and should never need dumping.

It is anticipated that some uses of the present invention will gain advantage from mixed dissociated gases. In such applications, a production cell lid shown in FIG. 4 will suit the purpose. This lid is provided with an open cavity directly above electrode plates where the mixed gases rise, mix and pass through to the fluid reservoir Where dissociated gases must be isolated, the production cell lid of FIG. 6 is required. This electrolysis cell lid provides walled cavities directly above the electrode plates to prevent dissociated gases from mixing. The cavities are extended along one side of the lid to provide volume common to a manifold. Two chambers in a row are extended to the same side, followed by two more chambers extended to the side opposite. This order is repeated for however many plates are utilized. A manifold is provided to either side of the electrode stacks to segregate the isolated hydrogen and oxygen gases. Because the polarity of the plates cycles through all charges, anodic, cathodic and neutral, each plate, at different instances of time, produces either hydrogen or oxygen gas. Thus the gases are isolated and segregated by the production cell lid, but the discharge must be switched by a gas directional control valve.

The electrolyte solution used is a combination of 86.5% water, 10.8% sodium bicarbonate, 1.35% bismuth subsalicylate, 1.35% magnesium sulfate by volume. The preferred range is +/−10% water, +/−4% sodium bicarbonate, and +/−1% of both bismuth subsalicylate and magnesium sulfate. The electrolyte is a catalyst to electrolytic action, but it also plays into the design of electrode surface protection.

At the anode, additional surface protection is provided by the electroplating phenomenon that occurs with the metals in the electrolyte solution. The Bismuth molecule of the bismuth subsalicylate bonds with the weak positive side of the neutral plate and strong positive side of the anode plate while holding on to its carbon and a majority of its hydrogen molecules and releases some of its oxygen. The carbon molecules are attracted toward the cathode and away from the weak positive plate and the strong positive plate, allowing more bismuth and other elements to bond with the anode as oxygen molecules are released. The sodium molecule of the sodium bicarbonate bonds with the anode and also has a carbon molecule attracted to the cathode while some oxygen and a small amount of hydroxide gas are released. The magnesium of the magnesium sulfate bonds with the anode while the sulfur pulls toward the cathode and oxygen is released. Hydrogen gas is released at the cathode. The carbon and oxygen of the bismuth subsalicylate bond with the cathode, holding on to its bismuth while releasing some hydrogen. The carbon and oxygen of the sodium bicarbonate bond with the cathode, holding on to its sodium while releasing its hydrogen molecules. The sulfur and oxygen of the magnesium sulfate bond at the anode, but it releases some oxygen.

Various electrode shapes and characteristics have been contemplated and tested. FIG. 11-FIG. 16 show various combinations including a flat plate, a bent plate, and a conical shape. These shapes can be provided with a gap in the center which increases the amount of flow across the electrodes.

FIG. 8 and FIG. 9 depict grooves cut into the surface of electrodes to increase their surface area. Also, the shape traps bubbles in the fluid gas flow, limiting any side to side migration. Also the jagged shape of the groove provides a poor surface to adhere to facilitating gas bubble detachment. The grooves are intended to be less than 25% of the plate thickness and to repeat on centers of less than 50% of the electrode plate thickness.

A novel self-enclosed electrode, in which no electrolysis cell casing is required, is shown in FIG. 10. The electrode grooves are located with adequate precision to allow the grooves cut in adjacent electrodes to align such that they form a single channel twice the size of the grove. This allows a minimal amount of electrolyte to pass across the electrode minimizing the amount of wasted heat lost to the electrolyte solution. Groove depths should not exceed 25% of the electrode thickness and rows should not be spaced less than a plate thickness apart. The same margin, electrode thickness is protected about the periphery to ensure fluid tight integrity. The distance of the electrode gap is provided through non-conductive spacers. When the plates are brought together in compression, a fluid tight seal is created, eliminating the requirement of a separate fluid tight casing.

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

What is claimed is:

1. An electrolytic apparatus to dissociate water into its constituent gases comprising:
   one or more electrolysis cells in which water is dissociated into its constituent gases;
   a quantity of electrolyte, including water to be dissociated contained in each electrolysis cell;
   electrical means to conduct electrical energy from an external source, through an electrical bussing system, to a plurality of interleaved electrodes of staggered polarity such that an electrode of neutral charge precedes and follows every anode and cathode of an electrode stack, and in which the electrical bussing system includes four isolated electric conductors to collectively transmit an anodic charge, a cathodic charge, and two neutrals; and
   a conduit to exhaust dissociated gases from the electrolysis cell to their end use.

2. The apparatus of claim 1 in which each of the four isolated busses are made common to every fourth electrode in an equally spaced stack of electrodes.

3. The apparatus of claim 2 in which electrode plate surface is etched to increase plate surface area.

4. The apparatus of claim 3 in which the etching depth and width is equal to or less than 25% of the electrode thickness.

5. The apparatus of claim 4 in which the etching is oriented in line with fluid flow in rows spaced on centers equal to 25% or more of the electrode thickness.

6. The apparatus of claim 1 in which the electrolyte mixture consists of water, sodium bicarbonate, bismuth subsalicylate and magnesium sulfate.

7. The apparatus of claim 6 in which the electrolyte consists of 86.5% water, plus or minus ten percent, 10.8% sodium bicarbonate, plus or minus four percent, 1.35% bismuth subsalicylate, plus or minus one percent and 1.35% magnesium sulfate, plus or minutes 1% by volume.

8. An electrolytic apparatus to isolate and segregate the constituent gases of dissociated water comprising:
   one or more electrolysis cells in which water is dissociated into its constituent gases;
   a quantity of electrolyte, including water to be dissociated contained in each electrolysis cell;
   electrical means to conduct electrical energy from an external source, through an electrical bussing system, to a plurality of interleaved electrodes of staggered polarity such that an electrode of neutral charge precedes and follows every anode and cathode of an electrode stack and in which the electrical bussing system includes four isolated electric conductors to collectively transmit an anodic charge, a cathodic charge, and two neutrals;
   a gas isolation chamber, including a manifold to exhaust hydrogen gas dissociated at the cathode;
   a second gas isolation chamber, including a second manifold to exhaust oxygen gas, and some hydroxide dissociated at the anode; and
   a gas directional control valve to switch destination of discharge each time polarity cycles through a phase change.

9. The apparatus of claim 8 in which the discharge of consecutive gas isolation chambers are common to one gas discharge manifold, with the discharge of each succeeding two gas isolation and segregation chambers common to a different exhaust manifold.

10. The apparatus of claim 8 in which each of the four isolated busses are made common to every fourth electrode in an equally spaced stack of electrodes.

11. The apparatus of claim 10 in which electrode plate surface is etched to increase plate surface area.

12. The apparatus of claim 11 in which the etching depth and width is equal to or less than 25% of the electrode thickness.

13. The apparatus of claim 12 in which the etching is oriented in line with fluid flow in rows spaced on centers equal to 25% or more of the electrode thickness.

14. The apparatus of claim 8 in which the electrolyte mixture consists of water, sodium bicarbonate, bismuth subsalicylate and magnesium sulfate.

15. The apparatus of claim 14 in which the electrolyte consists of 86.5% water, plus or minus ten percent, 10.8% sodium bicarbonate, plus or minus four percent, 1.35% bismuth subsalicylate, plus or minus one percent and 1.35% magnesium sulfate, plus or minutes 1% by volume.

* * * * *